(12) United States Patent
In et al.

(10) Patent No.: US 9,779,849 B2
(45) Date of Patent: Oct. 3, 2017

(54) ALUMINUM-BASED CONDUCTIVE MATERIAL AND ELECTRIC WIRE AND CABLE USING THE SAME

(75) Inventors: Hiroyuki In, Kurume (JP); Fumiyo Annou, Kurume (JP); Daisuke Matsunaga, Kurume (JP); Hiromoto Kitahara, Kumamoto (JP); Shinji Ando, Kumamoto (JP); Masayuki Tsushida, Kumamoto (JP); Toshifumi Ogawa, Kitakyushu (JP)

(73) Assignees: DYDEN CORPORATION, Kurume-shi (JP); FUKUOKA PREFECTURAL GOVERNMENT, Fukuoka-shi (JP); NATIONAL UNIVERSITY CORPORATION KUMAMOTO UNIVERSITY, Kumamoto-shi (JP)

( * ) Notice: Subject to any disclaimer, the term of this patent is extended or adjusted under 35 U.S.C. 154(b) by 600 days.

(21) Appl. No.: 14/342,660

(22) PCT Filed: Sep. 4, 2012

(86) PCT No.: PCT/JP2012/072479
§ 371 (c)(1),
(2), (4) Date: Apr. 17, 2014

(87) PCT Pub. No.: WO2013/035699
PCT Pub. Date: Mar. 14, 2013

(65) Prior Publication Data
US 2014/0224523 A1    Aug. 14, 2014

(30) Foreign Application Priority Data

Sep. 5, 2011  (JP) .................................. 2011-193094

(51) Int. Cl.
*C22C 21/00* (2006.01)
*H01B 1/02* (2006.01)
(Continued)

(52) U.S. Cl.
CPC .............. *H01B 1/023* (2013.01); *B82Y 30/00* (2013.01); *C22C 21/00* (2013.01); *C22F 1/00* (2013.01); *C22F 1/04* (2013.01)

(58) Field of Classification Search
CPC ................................ C22C 21/00; H01B 1/023
See application file for complete search history.

(56) References Cited

U.S. PATENT DOCUMENTS 5,620,652 A    4/1997  Tack et al.
9,397,064 B2 *  7/2016  Milke .................. B23K 35/286
(Continued)

FOREIGN PATENT DOCUMENTS

CN    1566385 A    1/2005
CN    102119232 A    7/2011
(Continued)

OTHER PUBLICATIONS

English translation of Office Action dated Apr. 13, 2015, issued in counterpart Chinese Patent Application No. 201280043057.9 (10 pages).
(Continued)

*Primary Examiner* — Roy King
*Assistant Examiner* — Janelle Morillo
(74) *Attorney, Agent, or Firm* — Westerman, Hattori, Daniels & Adrian, LLP (57) ABSTRACT

An aluminium-based conductive material used in a driving part of robots or various devices and used, for example, in a wiring that is loaded with cyclic bending, as well as an electric wire and a cable using the same, contains 0.1 to 1.0 mass % of scandium and further contains, as a rest part, (Continued)

aluminium and unavoidable impure substances and is formed of a metal texture 10 having crystal grains 11 with an average grain size of 2 μm or less and aluminium-scandium series nanoprecipitates generated in a grain boundary 12 of the crystal grains 11. Further, it is preferable that the metal texture 10 contains the crystal grains 11 of 1 μm or less at a cross sectional ratio of 15% or more.

6 Claims, 2 Drawing Sheets (51) Int. Cl.
  *C22F 1/00* (2006.01)
  *C22F 1/04* (2006.01)
  *B82Y 30/00* (2011.01)

(56) References Cited

U.S. PATENT DOCUMENTS

| | | |
|---|---|---|
| 2007/0084527 A1 | 4/2007 | Ferrasse et al. |
| 2011/0132659 A1 | 6/2011 | Kusakari et al. |
| 2012/0321507 A1 | 12/2012 | Sekiya et al. |

FOREIGN PATENT DOCUMENTS

| | | | |
|---|---|---|---|
| JP | 07-316705 A | | 12/1995 |
| JP | 09-095750 A | | 4/1997 |
| JP | 10-505282 A | | 5/1998 |
| JP | 2000-303131 A | | 10/2000 |
| JP | 2001-131719 A | | 5/2001 |
| JP | 2001-254132 A | | 9/2001 |
| JP | 2001-348637 A | | 12/2001 |
| JP | 2001348637 A | * | 12/2001 |
| JP | 2002-266043 A | | 9/2002 |
| JP | 2002-302727 A | | 10/2002 |
| JP | 2010-163675 A | | 7/2010 |
| JP | 2011-157607 A | | 8/2011 |
| WO | 2011/105585 A1 | | 9/2011 |
| WO | 2011/105586 A1 | | 9/2011 |

OTHER PUBLICATIONS

International Search Report, dated Oct. 16, 2012, issued in corresponding application No. PCT/JP2012/072479.
Office Action dated Dec. 23, 2015, issued in counterpart Chinese Patent Application, No. 201280043057.9, with English translation. (14 pages).
Office Action dated Apr. 13, 2015, issued in corresponding Chinese Patent Application No. 201280043057.9 (9 pages).
Extended European Search Report dated May 18, 2015, issued in corresponding European Patent Application No. 12830099.3 (10 pages).
Min et al., "Effect of Al3Sc precipitate on the microstructural evolution during accumulative roll bonding in Al—0.2 wt. % Sc alloy", Journal of Materials Processing Technology, May 15, 2005, vol. 162-163, pp. 355-361, cited in Chinese Office Action dated Apr. 13, 2015 and Extended European Search Report dated May 18, 2015.
Lohar et al., "Microstructural investigations on as-cast and annealed Al—Sc and Al—Sc—Zr alloys", Materials Characterization, Sep. 30, 2009, vol. 60, No. 11, pp. 1387-1394, cited in Chinese Office Action dated Apr. 13, 2015.
Ferry et al., "Continuous and discontinuous grain coarsening in a fine-grained particle-containing Al—Sc alloy", Acta Materialia, Feb. 1, 2005, vol. 53, No. 4, pp. 1097-1109, cited in Extended European Search Report dated May 18, 2015.
Milman et al., "Effect of Alloying by Scandium, Zirconium and Yttrium on the Recrystallization and Hardening of Aluminum", Metallofizika i Noveishie Tekhnologii, Oct. 1, 2002, vol. 24, No. 10, pp. 1413-1427, cited in Extended European Search Report dated May 18, 2015.
Knipling et al., "Ambient- and high-temperature mechanical properties of isochronally aged Al—0.06Sc, Al—0.06Zr and Al—0.06Sc—0.06Zr (at.%) alloys", Acta Materialia, Feb. 1, 2011, vol. 59, No. 3, pp. 943-954, cited in Extended European Search Report dated May 18, 2015.
Zhihua et al., "Ageing strengthening and electrical conductivity of Al—xSc—0.04Zr (x=0,0.1%,0.2% and 0.4%)", Special Casting and Nonferrous Alloys, Jan. 1, 2010, vol. 30, No. 5, pp. 476-480, cited in Extended European Search Report dated May 18, 2015.

\* cited by examiner

ALUMINUM-BASED CONDUCTIVE MATERIAL AND ELECTRIC WIRE AND CABLE USING THE SAME

TECHNICAL FIELD

The present invention relates to an aluminium-based conductive material, as well as an electric wire and a cable using the same, used in wiring, for example, industrial robots, commercial robots, or various devices, in particular, in wiring a driving part or the like that is loaded with cyclic bending.

BACKGROUND ART

For example, a driving part of an industrial robot or a commercial robot, for example, a cable used in wiring an arm part, is loaded with cyclic bending while driving an arm, and a cable used in wiring a door part of an automobile is loaded with cyclic bending while opening or closing a door. For this reason, in a cable loaded with cyclic bending, a conductive wire resistant to cyclic bending (hardly fractured) is used instead of a normal conductive wire. In addition, the conductive wire with a smaller diameter is less liable to be fractured by cyclic bending, so that, in a conductive wire of a cable, a stranded wire formed of a plurality of thin wires is used rather than a solid wire.

Further, as a conductive wire that is resistant to cyclic bending load, for example, such that the number of cycles to fracture (fatigue life) is 50,000 times or more when the conductive wire is subjected to cyclic bending of ±0.15% strain oscillation at normal temperature, Patent Literature 1, for example, discloses an aluminium alloy wire material containing 0.1 to 0.4 mass % of iron, 0.1 to 0.3 mass % of copper, 0.02 to 0.2 mass % of magnesium, 0.02 to 0.2 mass % of silicon, and 0.001 to 0.01 mass % of a combination of titanium and vanadium, wherein a crystal grain size in a vertical cross section in a wire drawing direction is 5 to 25 µm.

On the other hand, as an aluminium series conductive material having a smaller weight and being excellent in heat resistance, tensile strength, and electric conductivity. Patent Literature 2, for example, discloses an aluminium alloy containing 0.1 to 0.3 mass % (wt %) of scandium.

Also, as one in which the heat resistance of an aluminium alloy containing scandium is further improved, Patent Literature 3, for example, discloses an aluminium alloy containing 0.1 to 0.4 mass % of zirconium and 0.05 to 0.3 mass % of scandium, which is produced by performing a heat treatment after a plasticizing work; Patent Literature 4, for example, discloses an aluminium alloy containing 0.1 to 0.5 mass % of zirconium and 0.05 to 0.5 mass % of scandium, which is produced by performing a cold work after a heat treatment; and Patent Literature 5, for example, discloses an aluminium alloy containing 0.1 to 0.5 mass % of zirconium and 0.05 to 0.5 mass % of scandium, which is produced by performing a cold work, thereafter performing a heat treatment, and then performing a cold work again.

CITATION LIST

Patent Literature

Patent Literature 1: Japanese Unexamined Patent Application Publication No. 2010-163675
Patent Literature 2: Japanese Unexamined Patent Application Publication No. 07-316705
Patent Literature 3 Japanese Unexamined Patent Application Publication No. 2001-348637
Patent Literature 4 Japanese Unexamined Patent Application Publication No. 2002-266043
Patent Literature 5. Japanese Unexamined Patent Application Publication No. 2002-302727

SUMMARY OF THE INVENTION

Technical Problem

In the aluminium alloy wire material disclosed in Patent Literature 1, fatigue life is assumed to be 50,000 times or more; however, an actual robot moves 86,400 times in two days if one motion of the robot takes two seconds, so that the number of cycles exceeds the minimum lifetime. For this reason, when the aluminium alloy wire material disclosed in Patent Literature 1 is applied to a robot, there is a problem that the robot cannot be operated stably for a long period of time.

When a wire having a wire diameter of 80 µm is manufactured by using, for example, an aluminium alloy containing 0.1 mass % of scandium as an aluminium alloy disclosed in Patent Literature 2 and side-to-side cyclic bending tests are carried out using, as a specimen, a cable having a cross section of 0.2 mm$^2$ produced by using this wire (in a state in which the specimen is loaded with 100 g of weight, with a bending radius of 15 mm and a bending angle being in a range of ±90 degrees), the number of cycles to fracture of the cable is, for example, in the range of 300 to 500 thousand times.

When a wire having a wire diameter of 80 µm is manufactured by using, for example, an aluminium alloy containing 0.1 mass % of zirconium and 0.1 mass % of scandium, which is produced by performing a cold work with a cross section decrease ratio of 85%, as an aluminium alloy disclosed in Patent Literature 3 and the same side-to-side cyclic bending tests are carried out using, as a specimen, a cable having a cross section of 0.2 mm$^2$ produced by using this wire, the number of cycles to fracture of the cable is, for example, in the range of 500 to 800 thousand times.

When a wire having a wire diameter of 80 µm is manufactured by using, for example, an aluminium alloy containing 0.3 mass % of zirconium and 0.2 mass % of scandium, which is produced by performing a cold work with a cross section decrease ratio of 90%, as an aluminium alloy disclosed in Patent Literature 4 and the same side-to-side cyclic bending tests are carried out using, as a specimen, a cable having a cross section of 0.2 mm$^2$ produced by using this wire, the number of cycles to fracture of the cable is, for example, in the range of 2 to 3 million times.

When a wire having a wire diameter of 80 µm is manufactured by using, for example, an aluminium alloy containing 0.3 mass % of zirconium and 0.2 mass % of scandium, which is produced by performing a cold work with a cross section decrease ratio of 30%, subsequently performing a heat treatment at 350° C. for 50 hours, and thereafter performing a cold work with a cross section decrease ratio of 75%, as an aluminium alloy disclosed in Patent Literature 5 and the same side-to-side cyclic bending tests are carried out using, as a specimen, a cable having a cross section of 0.2 mm$^2$ produced by using this wire, the number of cycles to fracture of the cable is, for example, in the range of 3 to 4 million times.

Therefore, though a cable in which the number of cycles to fracture exceeds one million times can be obtained by adding scandium, this is not necessarily sufficient for the characteristics demanded in a cable for a high-function robot.

The present invention has been made in view of the above circumstances, and it is an object of the present invention to provide an aluminium-based conductive material, as well as an electric wire and a cable using the same, which is used for wiring a driving part of robots or various devices, can sufficiently withstand actual use with extremely few occurrences of disconnection during the use, and can withstand, for example, 3 million times, 5 million times, or 10 million times of dynamic driving tests.

Solution to Problem

To accomplish the above object, a first aspect of the present invention provides an aluminium-based conductive material containing 0.1 to 1.0 mass % of scandium and further containing, as a rest part, aluminium and unavoidable impure substances and being formed of a metal texture having crystal grains with an average grain size of 2 μm or less and aluminium-scandium series nanoprecipitates generated in a grain boundary of the crystal grains.

As a method of setting the average grain size of the crystal grains forming the metal texture to be 2 μm or less, there is, for example, a rolling processing method (including a die drawing method) at a low temperature in which the degree of processing is set to be 5 or more while cooling with a cooling medium (for example, oil). Here, the degree of processing is represented by $\ln(S_0/S_1)$ formula, where $S_0$ is a cross section before processing, and $S_1$ is a cross section after processing.

By setting the average grain size of the crystal grains to be 2 μm or less, the generated cracks notably come into collision with the crystal grains when the cracks propagate, thereby promoting deviation of the cracks and divarication of the cracks and suppressing the growth of the cracks in one direction. Also, by generating nanoprecipitates in the grain boundary of the crystal grains, the cracks are pinned when the cracks come into collision with the nanoprecipitates, thereby suppressing the growth of the cracks. Here, when the content of scandium is less than 0.1 mass %, the amount of the generated nanoprecipitates is small, and the effect of pinning the cracks is not notable. On the other hand, when the content of scandium exceeds 1.0 mass %, the electric conductivity of the aluminium-based conductive material decreases, thereby disadvantageously decreasing the functions as a conductive material.

To accomplish the above object, a second aspect of the present invention provides an aluminium-based conductive material containing 0.1 to 1.0 mass % of scandium and more than 0 (preferably 0.05 mass % or more) and 0.2 mass % or less of zirconium and further containing, as a rest part, aluminium and unavoidable impure substances and being formed of a metal texture having crystal grains with an average grain size of 2 μm or less and aluminium-scandium series nanoprecipitates generated in a grain boundary of the crystal grains.

Here, the nanoprecipitates can be generated also in the grains of the crystal grains.

As a method of setting the average grain size of the crystal grains to be 2 μm or less, the same method in the case of the aluminium-based conductive material according to the first aspect of the present invention can be adopted.

Also, the function of setting the average grain size of the crystal grains to be 2 μm or less and the function of setting the content of scandium to be within a range of 0.1 to 1.0 mass % are identical to those in the case of the aluminium-based conductive material according to the first aspect of the present invention, so that the description thereof will be omitted.

With respect to zirconium, a part thereof is dissolved in the crystal grains to form a solid solution, and the rest exists in the grain boundary of the crystal grains, thereby suppressing deformation of the crystal grains and the grain boundary at a high temperature and preventing decrease in the tensile strength of the aluminium-based conductive material after heat history at a high temperature. Here, the effect of improving the high-temperature strength increases according as the content of zirconium increases, and the effect is notable when the content is 0.05 mass % or more. On the other hand, when the content of zirconium exceeds 0.2 mass %, the electric conductivity of the aluminium-based conductive material notably decreases, thereby disadvantageously decreasing the functions as a conductive material. Also, excessive dissolving of zirconium deteriorates the dynamic flexibility of the metal texture (decreases the durability in dynamic driving tests), thereby disadvantageously decreasing the flexibility (the number of repeated cycles of bending until the fracture occurs, that is, the number of cycles to fracture) against the cyclic bending load.

In the aluminium-based conductive material according to the first or second aspect of the present invention, it is preferable that the nanoprecipitates have an average grain size of 1 to 60 nm.

Here, it is more preferable that the nanoprecipitates have an average grain size of 5 to 50 nm.

From texture observation of the aluminium-based conductive material, it can be confirmed that almost all the amount of contained scandium exists as nanoprecipitates. Therefore, when the grain size of the nanoprecipitates increases, the number of nanoprecipitates decreases. Also, the function of pinning the cracks by the nanoprecipitates becomes more notable according as the grain size of the nanoprecipitates increases. Therefore, when the cracks generated in the aluminium-based conductive material grow, the effect of pinning the cracks by the nanoprecipitates is dependent on the number of nanoprecipitates and the grain size of the nanoprecipitates. When the average grain size of the nanoprecipitates is less than 1 nm, the number of nanoprecipitates increases, so that the frequency of generation of pinning the cracks increases; however, the function of pinning the cracks by the nanoprecipitates is not large, so that the effect of pinning the cracks is not notable. On the other hand, when the average grain size of the nanoprecipitates exceeds 60 nm, the function of pinning the cracks by the nanoprecipitates increases; however, the number of nanoprecipitates decreases, so that the frequency of generation of pinning the cracks decreases, and the effect of pinning the cracks is not notable. For this reason, the average grain size of the nanoprecipitates is set to be 1 to 60 nm.

Further, the range of the average grain size of the nanoprecipitates that increases both the frequency of generation of pinning the cracks by the nanoprecipitates and the function of pinning the cracks by the nanoprecipitates is 5 to 50 nm.

In the aluminium-based conductive material according to the first or second aspect of the present invention, it is preferable that the metal texture contains the crystal grains of 1 μm or less at a cross sectional ratio of 15% or more.

Here, when the metal texture contains the crystal grains of 1 μm or less at a cross sectional ratio of 20% or more, the aluminium-based conductive material is resistant to at least ten million times of dynamic driving tests.

In order that the crystal grains of 1 µm or less are contained 15% or more at a cross sectional ratio in the metal texture, a rolling processing method (including a die drawing method) at a low temperature in which the degree of processing is set to be 3.0 or more while cooling with a cooling medium (for example, oil) can be used, for example. In order that the crystal grains of 1 µm or less are contained 20% or more at a cross sectional ratio, a rolling processing method at a low temperature in which the degree of processing is set to be 3.5 or more while cooling with a cooling medium can be used.

By allowing the crystal grains of 1 µm or less to be contained 15% or more at a cross sectional ratio in the metal texture, the generated cracks can notably be allowed to come into collision with the crystal grains when the cracks propagate, whereby deviation of the cracks and divarication of the cracks can be promoted. By allowing the crystal grains of 1 µm or less to be contained 20% or more at a cross sectional ratio in the metal texture, the generated cracks can further more notably be allowed to come into collision with the crystal grains when the cracks propagate, whereby deviation of the cracks and divarication of the cracks can be further promoted.

To accomplish the above object, a third aspect of the present invention provides an electric wire in which the aluminium-based conductive material according to the first or second aspect of the present invention is used as a conductor wire.

Here, it is preferable that the conductor wire has a diameter of 0.05 mm or more and 0.5 mm or less.

Further, the electric wire can be used as an electric wire for internal wiring of an apparatus.

To accomplish the above object, a fourth aspect of the present invention provides a cable in which the aluminium-based conductive material according to the first or second aspect of the present invention is used as a conductor wire.

Here, it is preferable that the conductor wire has a diameter of 0.05 mm or more and 0.5 mm or less.

Further, the cable can be used as a connector cable of a quick-charging stand apparatus or as a cab tyre cable of an electric welding machine.

In addition, the cable can be used also as a cable for internal wiring of an apparatus.

Advantageous Effects of Invention

In the aluminium-based conductive material according to the first or second aspect of the present invention, the average grain size of the crystal grains is 2 µm or less, so that the generated cracks frequently come into collision with the crystal grains when the cracks propagate, whereby deviation of the cracks and divarication of the cracks are promoted, and the growth rate of the cracks growing in one direction decreases. Also, since aluminium-scandium series nanoprecipitates are generated, the tips of the generated cracks are pinned by the nanoprecipitates, whereby stoppage of the growth of the cracks or decrease in the growth rate of the cracks is further promoted. This allows that the aluminium-based conductive material is resistant to dynamic driving tests and, for example, when the aluminium-based conductive material is used as a material for an electric wire or cable that is used in a part loaded with cyclic bending, such as an arm of robots or a driving part of various devices, disconnection at the time of using the electric wire or cable can be prevented, thereby improving the reliability of the robots or various devices. Further, the burden in maintaining the robots or various devices can be alleviated, thereby achieving reduction of the operation costs.

In the aluminium-based conductive material according to the second aspect of the present invention, when the nanoprecipitates are generated also within the grains of the crystal grains, the tips of the cracks are pinned by the nanoprecipitates when the cracks grow within the grains of the crystal grains, whereby stoppage of the growth of the cracks or decrease in the growth rate of the cracks is promoted, and in-grain destruction of the crystal grains can be suppressed.

In the aluminium-based conductive material according to the first or second aspect of the present invention, when the average grain size of the nanoprecipitates is 1 to 60 nm, stoppage of the growth of the cracks or decrease in the growth rate of the cracks can be achieved due to the effect of pinning the cracks by the nanoprecipitates.

Also, when the average grain size of the nanoprecipitates is 5 to 50 nm, both the frequency of generation of pinning the cracks by the nanoprecipitates and the function of pinning the cracks by the nanoprecipitates can be increased, thereby effectively producing the effect of pinning the cracks by the nanoprecipitates.

In the aluminium-based conductive material according to the first or second aspect of the present invention, if the metal texture contains the crystal grains of 1 µm or less at a cross sectional ratio of 15% or more, the frequency of collision of the generated cracks to the crystal grains can be improved, and deviation of the cracks and divarication of the cracks can be promoted when the generated cracks propagate in the metal texture, so that the resistance accompanied by the growth of the cracks increases and the growth rate of the cracks can be decreased.

Also, when the metal texture contains the crystal grains of 1 µm or less at a cross sectional ratio of 20% or more, the frequency of collision of the generated cracks to the crystal grains can be further improved, and deviation of the cracks and divarication of the cracks can be further promoted when the generated cracks propagate in the metal texture, so that the resistance accompanied by the growth of the cracks further increases and the growth rate of the cracks can be further decreased. This allows that the aluminium-based conductive material is resistant to at least ten million times of dynamic driving tests.

In the electric wire according to the third aspect of the present invention, an aluminium-based conductive material according to the first or second aspect of the present invention is used, so that, for example, an electric wire that can be used in a part loaded with cyclic bending can be manufactured. By this, early disconnection of the electric wire during the use can be prevented, and the reliability of various devices using this electric wire can be improved. Further, the burden in maintaining various devices can be alleviated.

In the electric wire according to the third aspect of the present invention, an aluminium-based conductive material according to the first or second aspect of the present invention is used as a conductor wire, so that, for example, by using this in wiring a part loaded with cyclic bending, such as an arm of robots or a driving part of various devices, early disconnection can be prevented, thereby improving the reliability of the robots or various devices. Further, the burden in maintaining the robots or various devices can be alleviated.

In the electric wire according to the third aspect of the present invention, when the diameter of the conductor wire is 0.05 mm or more and 0.5 mm or less, the strain generated in the conductor wire when the electric wire is loaded with cyclic bending can be reduced, whereby early disconnection of the conductor wire (electric wire) can be further prevented.

Also, when the electric wire is used as an electric wire for internal wiring of an apparatus, reduction in the weight of the apparatus can be achieved.

In the cable according to the fourth aspect of the present invention, an aluminium-based conductive material according to the first or second aspect of the present invention is used as a conductor wire, so that, for example, by using this in wiring a part loaded with cyclic bending, such as an arm of robots or a driving part of various devices, early disconnection can be prevented, thereby improving the reliability of the robots or various devices. Further, the burden in maintaining the robots or various devices can be alleviated.

In the cable according to the fourth aspect of the present invention, when the diameter of the conductor wire is 0.05 mm or more and 0.5 mm or less, the strain generated in the conductor wire when the cable is loaded with cyclic bending can be reduced, whereby early disconnection of the conductor wire (cable) can be further prevented.

Here, when the cable is used as a connector cable of a quick-charging stand apparatus, because the cable is formed of an aluminium-based conductive material, the connector cable has a reduced weight, thereby improving the operability.

Also, when the cable is used as a cab tyre cable of an electric welding machine, because the cable is formed of an aluminium-based conductive material, the cab tyre cable has a reduced weight, so that the movement of the cab tyre cable can be carried out comparatively easily even when the cab tyre cable has a large length in manufacturing a large-scale structure, thereby improving the workability of welding.

Further, when the cable is used as a cable for internal wiring of an apparatus, reduction in the weight of the apparatus can be achieved.

DESCRIPTION OF EMBODIMENTS

Subsequently, referring to the accompanying drawings, embodiments of the present invention will be described.

Figure 1:
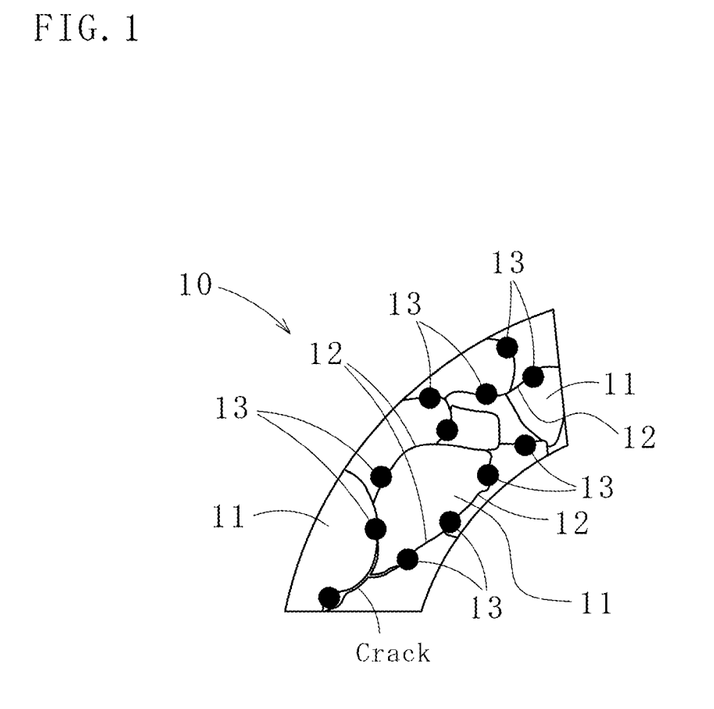
FIG. 1 is an explanatory diagram of a texture of an aluminium-based conductive material according to a first embodiment of the present invention.

Referring to FIG. 1, an aluminium-based conductive material according to the first embodiment of the present invention contains 0.1 to 1.0 mass % of scandium and further contains, as a rest part, aluminium and unavoidable impure substances (the content of the unavoidable impure substances being, for example, 0.1 to 0.35 mass %) and is formed of a metal texture 10 having crystal grains 11 of aluminium with an average grain size of 2 μm or less and nanoprecipitates 13 of $Al_3Sc$, which is an aluminium-scandium series intermetallic compound, generated in a grain boundary 12 of the crystal grains 11. Further, the crystal grains 11 having a size of 1 μm or less are contained 15% or more of at a cross sectional ratio, preferably 20% or more, and the nanoprecipitates 13 have an average grain size of 1 to 60 nm, preferably 5 to 50 nm. Here, part of the unavoidable impure substances is dissolved in the crystal grains 11 to form a solid solution, and the rest part exists in the grain boundary 12. Hereafter, description will be given in detail.

With use of aluminium having a purity of 99.9 mass % or more and scandium having a purity of 99 mass % or more, an aluminium alloy containing 0.1 to 1.0 mass % of scandium is cast to produce a conductive material block. Subsequently, from the conductive material block subjected to an aging treatment at 250 to 450° C. for 0.5 to 30 hours, for example, at 350° C. for one hour, a wire rod having a diameter of 10 mm, for example, is produced by a cutting work. Then, the wire rod is subjected to a rotary forging work using a swaging machine until a predetermined diameter is attained, so as to form a wire, followed by a heat treatment at 300 to 500° C. for 0.1 to 5 hours, for example, at 450° C. for one hour. By performing the heat treatment after the swaging work, formation of isometric crystals is promoted, whereby miniaturization of average crystal grains and improvement in the probability of forming fine crystal grains of 1 μm or less can be achieved.

Here, in the case of manufacturing, for example, a cable from the aluminium-based conductive material, the wire subjected to the heat treatment is subjected to a die wire drawing work to form a drawn wire material (80 to 120 μm), and a stranded wire is formed by using the drawn wire material as a conductor wire, thereby to form a cable.

Here, by performing a heat treatment to promote formation of isometric crystals after the final finished diameter of the wire worked by using the swaging machine is set to be, for example, 1.5 mm, and thereafter performing a die wire drawing work to attain a working degree of 5.9 until the diameter reaches 80 micron, the crystal grains 11 forming the metal texture 10 will have an average grain size of 2 μm or less, and the ratio of existence of the crystal grains 11 of 1 μm or less will be 15% or more in a cross sectional ratio.

Also, by performing a heat treatment to promote formation of isometric crystals after the final finished diameter of the wire worked by using the swaging machine is set to be, for example, 2.0 mm, and thereafter performing a die wire drawing work to attain a working degree of 6.4 until the diameter reaches 80 micron, the crystal grains 11 forming the metal texture 10 will have an average grain size of 2 μm or less, and the ratio of existence of the crystal grains 11 of 1 μm or less will be 20% or more in a cross sectional ratio. Further, by setting the final finished diameter of the wire to be, for example, 3.0 mm and thereafter performing a die wire drawing work to attain a working degree of 7.2 until the diameter reaches 80 micron, the crystal grains 11 forming the metal texture 10 will have an average grain size of 2 μm or less, and the ratio of existence of the crystal grains 11 of 1 μm or less will be 50% or more in a cross sectional ratio.

By setting the average grain size of the crystal grains 11 to be 2 μm or less, the number of crystal grains 11 contained in the metal texture 10 of a unit volume increases, so that, for example, when cracks are generated by cyclic bending load, the cracks frequently come into collision with the crystal grains 11 when the cracks propagate. For this reason, when the cracks grow, deviation of the cracks and divarication of the cracks are promoted, whereby the speed by which the cracks grow in one direction can be decreased. As a result of this, the flexibility (the number of repeated cycles of bending until the fracture occurs, that is, the number of cycles to fracture) against cyclic bending load can be improved. Here, when the crystal grains 11 of 1 μm or less occupy 15% or more in the cross sectional ratio, the number of crystal grains 11 contained in the metal texture 10 of a unit volume can be increased, and the cracks come notably into collision with the crystal grains 11, whereby deviation of the cracks and divarication of the cracks can be promoted. Further, when the crystal grains 11 of 1 μm or less occupy 20% or more in the cross sectional ratio, the number of crystal grains 11 contained in the metal texture 10 of a unit volume can be further increased, and the cracks come further more notably into collision with the crystal grains 11, whereby deviation of the cracks and divarication of the cracks can be further promoted, and the aluminium-based conductive material can be resistant to at least ten million times of dynamic driving tests.

Further, during the aging treatment, scandium that exits in the crystal grains 11 of aluminium and in the grain boundary 12 reacts with aluminium and precipitates in the grain boundary 12 as nanoprecipitates 13 of $Al_3Sc$ which is an intermetallic compound. Here, by selecting the temperature and the time within the ranges of the aging treatment temperature and the aging treatment time, the average grain size of the nanoprecipitates 13 can be adjusted within a range of 1 to 60 nm.

When the nanoprecipitates 13 are generated in the grain boundary 12, the tips of the cracks that grow along the grain boundary 12 come into collision with the nanoprecipitates 13, and the tips of the cracks are pinned by the nanoprecipitates 13, whereby stoppage of the growth of the cracks occurs, and decrease in the growth rate of the cracks is further promoted. Here, when the content of scandium is less than 0.1 mass %, the amount of the generated nanoprecipitates 13 becomes small, and the effect of pinning the cracks decreases. On the other hand, when the content of scandium exceeds 1.0 mass %, the amount of nanoprecipitates 13 existing in the grain boundary 12 becomes large, so that the electric conductivity decreases and the function as a conductive material decreases, though the effect of pinning the cracks is improved. For this reason, the content of scandium has been set to be within a range of 0.1 to 1.0 mass %.

The total amount of generated nanoprecipitates 13 is determined by the content of scandium, so that the grain size of the nanoprecipitates 13 decreases when the number of nanoprecipitates 13 increases, and the grain size of the nanoprecipitates 13 increases when the number of nanoprecipitates 13 decreases. On the other hand, when the cracks generated in the metal texture 10 grow, the effect of pinning the cracks by the nanoprecipitates 13 increases according as the number of nanoprecipitates 13 increases and according as the grain size of the nanoprecipitates 13 increases.

Here, when the average grain size of the nanoprecipitates 13 is less than 1 nm, the number of nanoprecipitates 13 increases, so that the frequency of generation of pinning the cracks increases; however, the function of pinning the cracks by the nanoprecipitates 13 is not large, so that the effect of pinning the cracks is not notable. On the other hand, when the average grain size of the nanoprecipitates 13 exceeds 60 nm, the function of pinning the cracks by the nanoprecipitates 13 increases; however, the number of nanoprecipitates 13 decreases, so that the frequency of generation of pinning the cracks decreases, and the effect of pinning the cracks is not notable. For this reason, when the total amount of the nanoprecipitates 13 is constant, stoppage of the growth of the cracks and decrease in the growth rate of the cracks can be achieved by the effect of pinning the cracks by the nanoprecipitates 13 by setting the average grain size of the nanoprecipitates 13 to be 1 to 60 nm. Further, by setting the average grain size of the nanoprecipitates 13 to be 5 to 50 nm, the function of pinning the cracks by the nanoprecipitates 13 can be maintained at a high level while maintaining the frequency of generation of pinning the cracks by the nanoprecipitates 13 to be at a high level, whereby the effect of pinning the cracks by the nanoprecipitates 13 can be improved.

In the aluminium-based conductive material according to the first embodiment of the present invention, when texture control is made to allow the crystal grains 11 of 1 μm or less to be contained at 15% or more in a cross sectional ratio, the following occurs. That is, even though cracks are generated in the metal texture 10, the period of time needed for the cracks to grow in one direction in the metal texture 10 becomes long by synergism of the deviation of the cracks and the divarication of the cracks generated when the cracks grow along the grain boundary 12 in the metal texture 10 and the effect of pinning the cracks when the cracks come into collision with the nanoprecipitates 13. As a result of this, the aluminium-based conductive material is resistant to dynamic driving tests (for example, cyclic bending tests) carried out for a long period of time. Further, when the texture control is made to allow the crystal grains of 1 μm or less to be contained at 20% or more in a cross sectional ratio, the aluminium-based conductive material is resistant to at least ten million times of dynamic driving tests.

For this reason, when an electric wire or cable using a conductor wire made of an aluminium-based conductive material according to the first embodiment of the present invention and having a conductor wire diameter of 0.05 mm or more and 0.5 mm or less is used, for example, in wiring a driving part (an example of an electric wire or cable for internal wiring of an apparatus) such as an ascending/descending part of an elevator or an arm part of a robot, the strain generated in the conductor wire can be reduced when the electric wire or cable is loaded with cyclic bending, whereby early disconnection of the conductor wire (electric wire or cable) can be further prevented. As a result of this, high durability (prevention of disconnection at an early stage of the electric wire or cable) can be achieved in addition to the reduced weight and high flexibility that are the characteristics of the aluminium alloy series, whereby the device can be stably operated for a long period of time, and improvement in the reliability of the device as well as alleviation of the burden in maintenance can be achieved.

Also, when a cable using a conductor wire made of an aluminium-based conductive material according to the first embodiment of the present invention and having a conductor wire diameter of 0.05 mm or more and 0.5 mm or less is used for usage that is loaded with tension, flexion, and torsion at the time of use, such as in a connector cable for a quick-charging stand apparatus of an electric automobile or a cab tyre cable of an electric welding machine, high durability (prevention of disconnection at an early stage of the cable) can be achieved in addition to the reduced weight and high flexibility that are the characteristics of the aluminium alloy series, whereby the device can be stably operated for a long period of time, and improvement in the reliability of the device as well as alleviation of the burden in maintenance can be achieved.

Figure 2:
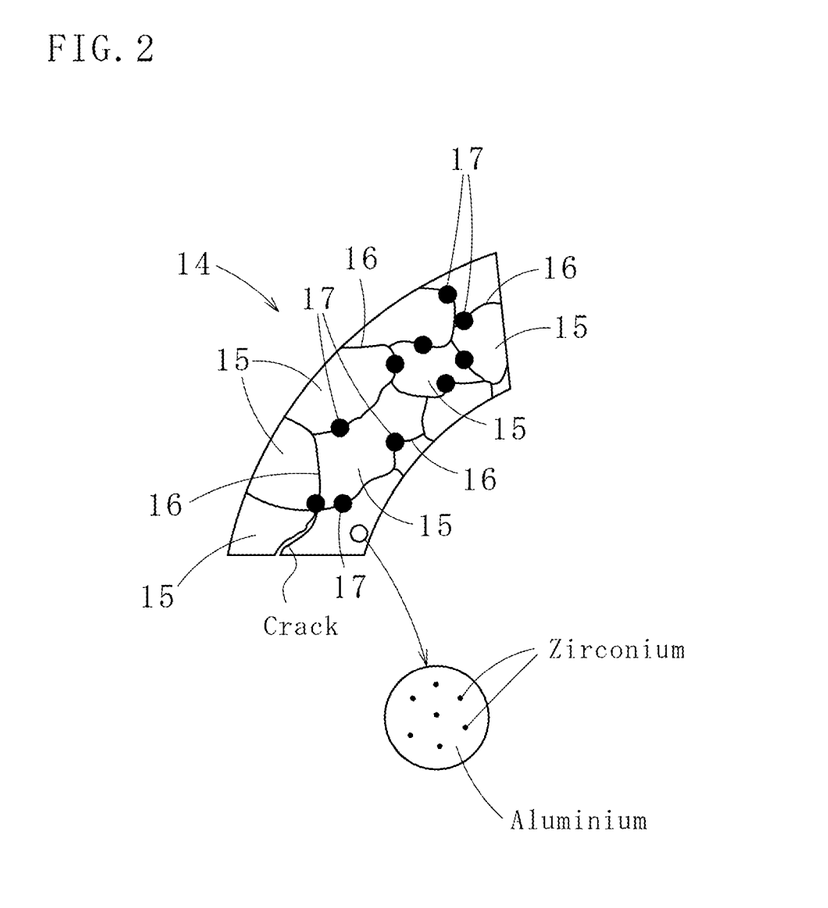
FIG. 2 is an explanatory diagram of a texture of an aluminium-based conductive material according to a second embodiment of the present invention.

Referring to FIG. 2, an aluminium-based conductive material according to the second embodiment of the present invention contains 0.1 to 1.0 mass % of scandium and more than 0 and 0.2 mass % or less of zirconium and further contains, as a rest part, aluminium and unavoidable impure substances (the content of the unavoidable impure substances being, for example, 0.1 to 0.35 mass %) and is formed of a metal texture 14 having crystal grains 15 of aluminium with an average grain size of 2 μm or less and nanoprecipitates 17 of $Al_3Sc$, which is an aluminium-scandium series intermetallic compound, generated in a grain boundary 16 of the crystal grains 15. Further, the crystal grains 15 having a size of 1 μm or less are contained 15% or more at a cross sectional ratio, preferably 20% or more, and the nanoprecipitates 17 have an average grain size of 1 to 60 nm, preferably 5 to 50 nm. Here, part of the nanoprecipitates can be allowed to exist in the crystal grains of aluminium in addition to the crystal grain boundary of aluminium.

Here, part of zirconium is dissolved in the crystal grains 15 to form a solid solution, and the rest part exists in the grain boundary 16. Part of the unavoidable impure substances is dissolved in the crystal grains 15 to form a solid solution, and the rest part exists in the grain boundary 16. Hereafter, description will be given in detail.

With use of aluminium having a purity of 99.9 mass % or more, scandium having a purity of 99 mass % or more, and zirconium having a purity of 99 mass % or more, an aluminium alloy containing 0.1 to 1.0 mass % of scandium and more than 0 and 0.2 mass % or less of zirconium is cast to produce a conductive material block. Subsequently, from the conductive material block subjected to an aging treatment at 250 to 450° C. for 0.5 to 30 hours, for example, at 350° C. for 24 hours, a wire rod having a diameter of 10 mm, for example, is produced by a cutting work. Then, the wire rod is subjected to a rotary forging work using a swaging machine until a predetermined diameter is attained, so as to form a wire, followed by a heat treatment at 300 to 500° C. for 0.1 to 5 hours, for example, at 45° C. for one hour. By performing the heat treatment after the swaging work, formation of isometric crystals is promoted, whereby miniaturization of average crystal grains and improvement in the probability of forming fine crystal grains of 1 μm or less can be achieved.

Here, in the case of manufacturing, for example, a cable from the aluminium-based conductive material, the wire subjected to the heat treatment is subjected to a die wire drawing work to form a drawn wire material (80 to 120 μm), and a stranded wire is formed by using the drawn wire material as a conductor wire, thereby to form a cable.

Here, by performing a heat treatment to promote formation of isometric crystals after the final finished diameter of the wire worked by using the swaging machine is set to be, for example, 1.5 mm, and thereafter performing a die wire drawing work to attain a working degree of 5.9 until the diameter reaches 80 micron, the crystal grains 15 forming the metal texture 14 will have an average grain size of 2 μm or less, and the ratio of existence of the crystal grains 15 of 1 μm or less will be 15% or more in a cross sectional ratio. Also, by performing a heat treatment to promote formation of isometric crystals after the final finished diameter of the wire worked by using the swaging machine is set to be, for example, 2.0 mm, and thereafter performing a die wire drawing work to attain a working degree of 6.4 until the diameter reaches 80 micron, the crystal grains 15 forming the metal texture 14 will have an average grain size of 2 μm or less, and the ratio of existence of the crystal grains 15 of 1 μm or less will be 20% or more in a cross sectional ratio. Further, by setting the final finished diameter of the wire to be, for example, 3.0 mm and thereafter performing a die wire drawing work to attain a working degree of 7.2 until the diameter reaches 80 micron, the crystal grains 15 forming the metal texture 14 will have an average grain size of 2 μm or less, and the ratio of existence of the crystal grains 15 of 1 μm or less will be 50% or more in a cross sectional ratio.

By setting the average grain size of the crystal grains 15 to be 2 μm or less, the number of crystal grains 15 contained in the metal texture 14 of a unit volume increases, so that, for example, when cracks are generated by cyclic bending load, the cracks frequently come into collision with the crystal grains 15 when the cracks propagate. For this reason, when the cracks grow, deviation of the cracks and divarication of the cracks are promoted, whereby the speed by which the cracks grow in one direction can be decreased. As a result of this, the flexibility (the number of repeated cycles of bending until the fracture occurs, that is, the number of cycles to fracture) against cyclic bending load can be improved. Here, when the crystal grains 15 of 1 μm or less occupy 15% or more in the cross sectional ratio, the number of crystal grains 15 contained in the metal texture 14 of a unit volume can be increased, and the cracks come notably into collision with the crystal grains 15, whereby deviation of the cracks and divarication of the cracks can be promoted. Further, when the crystal grains 15 of 1 μm or less occupy 20% or more in the cross sectional ratio, the number of crystal grains 1S contained in the metal texture 14 of a unit volume can be further increased, and the cracks come further more notably into collision with the crystal grains 15, whereby deviation of the cracks and divarication of the cracks can be further promoted, and the aluminium-based conductive material can be resistant at least to ten million times of dynamic driving tests.

Further, during the aging treatment, scandium that exits in the grain boundary 16 of the crystal grains 15 of aluminium reacts with aluminium and precipitates in the grain boundary 16 as nanoprecipitates 17. Here, by selecting the temperature and the time within the ranges of the aging treatment temperature and the aging treatment time, the average grain size of the nanoprecipitates 17 can be adjusted within a range of 1 to 60 nm.

Here, when scandium is allowed to exist respectively in the grain boundary of the crystal grains of aluminium and in the grains of aluminium, scandium reacts respectively with aluminium and precipitates as nanoprecipitates in the grain boundary of the crystal grains and in the grains.

When the nanoprecipitates 17 are generated in the grain boundary 16, the tips of the cracks that grow along the grain boundary 16 come into collision with the nanoprecipitates 17, and the tips of the cracks are pinned by the nanoprecipitates 17, whereby stoppage of the growth of the cracks occurs, and decrease in the growth rate of the cracks is further promoted. Here, when the content of scandium is less than 0.1 mass %, the amount of the generated nanoprecipitates 17 becomes small, and the effect of pinning the cracks decreases. On the other hand, when the content of scandium exceeds 1.0 mass %, the amount of nanoprecipitates 17 existing in the grain boundary 16 becomes large, so that the electric conductivity decreases and the function as a conductive material decreases, though the effect of pinning the cracks is improved. For this reason, the content of scandium has been set to be within a range of 0.1 to 1.0 mass %.

Here, when the nanoprecipitates are generated also in the grains of the crystal grains of aluminium, that is, when the metal texture has the crystal grains of aluminium, the nanoprecipitates existing in the grain boundary of the crystal grains of aluminium, and the nanoprecipitates existing in the grains of the crystal grains of aluminium, the cracks that grow in the metal texture come into collision with the nanoprecipitates existing in the grain boundary so as to be pinned when the cracks grow along the grain boundary of the crystal grains, and come into collision with the nanoprecipitates existing in the grains so as to be pinned when the cracks grow in the grains of the crystal grains. For this reason, stoppage of the growth of the cracks that grow in the metal texture or decrease in the growth rate of the cracks is promoted.

The total amount of generated nanoprecipitates 17 is determined by the content of scandium, so that the grain size of the nanoprecipitates 17 decreases when the number of nanoprecipitates 17 increases, and the grain size of the nanoprecipitates 17 increases when the number of nanoprecipitates 17 decreases. On the other hand, when the cracks generated in the metal texture 14 grow, the effect of pinning the cracks by the nanoprecipitates 17 increases according as the number of nanoprecipitates 17 increases and according as the grain size of the nanoprecipitates 17 increases.

Here, when the average grain size of the nanoprecipitates 17 is less than 1 nm, the number of nanoprecipitates 17 increases, so that the frequency of generation of pinning the cracks increases; however, the function of pinning the cracks by the nanoprecipitates 17 is not large, so that the effect of pinning the cracks is not notable. On the other hand, when the average grain size of the nanoprecipitates 17 exceeds 60 nm, the function of pinning the cracks by the nanoprecipitates 17 increases; however, the number of nanoprecipitates 17 decreases, so that the frequency of generation of pinning the cracks decreases, and the effect of pinning the cracks is not notable. For this reason, when the total amount of the nanoprecipitates 17 is constant, stoppage of the growth of the cracks and decrease in the growth rate of the cracks can be achieved by the effect of pinning the cracks by the nanoprecipitates 17 by setting the average grain size of the nanoprecipitates 17 to be 1 to 60 nm. Further, by setting the average grain size of the nanoprecipitates 17 to be 5 to 50 nm, the function of pinning the cracks by the nanoprecipitates 17 can be maintained at a high level while maintaining the frequency of generation of pinning the cracks to be at a high level, whereby the effect of pinning the cracks by the nanoprecipitates 17 can be further improved.

Also, by the presence of zirconium in the crystal grains 15 and in the grain boundary 16, decrease in the tensile strength after heat history at a high temperature can be prevented. For example, a wire material formed from an aluminium-based conductive material containing 0.3 mass % of scandium has a tensile strength $\sigma_{RT}$ at room temperature of 300 MPa and has a tensile strength $\sigma_{260}$ immediately after being heated at 260° C. for one hour of 294 MPa, so that the tensile strength decreases. Here, when the heat resistance of the wire material is evaluated as $(\sigma_{260}/\sigma_{RT}) \times 100$, the heat resistance of the aluminium-based conductive material containing 0.3 mass % of scandium is 98%.

On the other hand, a wire material formed from an aluminium-based conductive material containing 0.01 mass % of zirconium and 0.3 mass % of scandium has a tensile strength $\sigma_{RT}$ at room temperature of 300 MPa and has a tensile strength $\sigma_{260}$ immediately after being heated at 260° C. for one hour of 294 MPa (heat resistance of 98%), which is not so different from that in the case in which zirconium is not contained. However, a wire material formed from an aluminium-based conductive material containing 0.05 mass % of zirconium and 0.3 mass % of scandium has a tensile strength $\sigma_{RT}$ at room temperature of 305 MPa and has a tensile strength $\sigma_{260}$ immediately after being heated at 260° C. for one hour of 303 MPa (heat resistance of 99%), and a wire material formed from an aluminium-based conductive material containing 0.1 mass % of zirconium and 0.3 mass % of scandium has a tensile strength $\sigma_{RT}$ at room temperature of 310 MPa and has a tensile strength $\sigma_{260}$ immediately after being heated at 260° C. for one hour of 309 MPa (heat resistance of 100%), so that, when zirconium is contained, the tensile strength immediately after being heated at 260° C. for one hour can be improved (decrease in the tensile strength is prevented). Therefore, the aluminium-based conductive material can have an ensured strength as a wire material even after being subjected to heat history at a high temperature.

Here, the effect of improving the tensile strength of an aluminium-based conductive material at a high temperature is notable when the content of zirconium is 0.05 mass % or more. On the other hand, when the content of zirconium exceeds 0.2 mass %, the electric conductivity decreases and the function as a conductive material decreases though the effect of improving the tensile strength after heat history increases. For this reason, it is preferable that the content of zirconium is 0.05 mass % or more, and an upper limit thereof has been set to be 0.2 mass %.

In the aluminium-based conductive material according to the second embodiment of the present invention, when texture control is made to allow the crystal grains 15 of 1 μm or less to be contained at 15% or more in a cross sectional ratio, the following occurs. That is, even though cracks are generated in the metal texture 14, the period of time needed for the cracks to grow in one direction in the metal texture 14 becomes long by synergism of the deviation of the cracks and the divarication of the cracks generated when the cracks grow along the grain boundary 16 in the metal texture 14 and the effect of pinning the cracks when the cracks come into collision with the nanoprecipitates 16. As a result of this, the aluminium-based conductive material is resistant to dynamic driving tests (for example, cyclic bending tests) carried out for a long period of time. Further, when the texture control is made to allow the crystal grains of 1 μm or less to be contained at 20% or more in a cross sectional ratio, the aluminium-based conductive material is resistant to at least ten million times of dynamic driving tests.

For this reason, when an electric wire or cable using a conductor wire made of an aluminium-based conductive material according to the second embodiment of the present invention and having a conductor wire diameter of 0.05 mm or more and 0.5 mm or less is used, for example, in wiring a driving part (an example of an electric wire or cable for internal wiring of an apparatus) such as an ascending/descending part of an elevator or an arm part of a robot, the strain generated in the conductor wire can be reduced when the electric wire or cable is loaded with cyclic bending, whereby early disconnection of the conductor wire (electric wire or cable) can be further prevented. As a result of this, high durability (prevention of disconnection at an early stage of the electric wire or cable) can be achieved in addition to the reduced weight and high flexibility that are the characteristics of the aluminium alloy series, whereby the device can be stably operated for a long period of time, and improvement in the reliability of the device as well as alleviation of the burden in maintenance can be achieved.

Also, when a cable using a conductor wire made of an aluminium-based conductive material according to the second embodiment of the present invention and having a conductor wire diameter of 0.05 mm or more and 0.5 mm or less is used for usage that is loaded with tension, flexion, and torsion at the time of use, such as in a connector cable for a quick-charging stand apparatus of an electric automobile or a cab tyre cable of an electric welding machine, high durability (prevention of disconnection at an early stage of the cable) can be achieved in addition to the reduced weight and high flexibility that are the characteristics of the aluminium alloy series, whereby the device can be stably operated for a long period of time, and improvement in the reliability of the device as well as alleviation of the burden in maintenance can be achieved.

Also, because part of zirconium is dissolved in the crystal grains 15 to form a solid solution and the rest part exists in the grain boundary 16, decrease in the tensile strength after heat history at a high temperature can be prevented in an aluminium-based conductive material according to the second embodiment, and decrease in the flexibility of the aluminium-based conductive material subjected to heat history at a high temperature can be prevented. For this reason, when a conductor wire of a cable in which the temperature temporarily rises due to a large electric current flowing at the time of use, such as a connector cable for a quick-charging stand apparatus of an electric automobile or a cab tyre cable of an electric welding machine, a cable in which the temperature largely changes due to change in the environment, such as a connection cable of a solar light power generation module (an example of a cable for internal wiring of an apparatus), or a cable for wiring a driving part (arm part) of a robot (an example of a cable for internal wiring of an apparatus) that may possibly be exposed to high temperature environment such as a factory or a place of hazards, is manufactured by using an aluminium-based conductive material according to the second embodiment, the tensile strength and further the durability after being exposed to temporary high temperature can be ensured, and the cable can be stably used for a long period of time. As a result of this, reliability of the cable or device can be improved, and the burden in maintenance can be alleviated.

Hereinafter, a description will be given on experimental examples (including comparative examples) for confirming functional effects of the present invention.

COMPARATIVE EXAMPLE 1

A wire rod having a diameter of 10 mm was collected from an ingot of aluminium having a purity of 99.95 mass % by a cutting work, and the collected wire rod was molded into a wire having a diameter of 2 mm with use of a swaging machine. Subsequently, after the wire was subjected to a heat treatment at 450° C. for one hour, the wire was subjected to a die wire drawing work to produce a drawn wire material having a diameter of 80 μm. From metal texture observation of the drawn wire material, it was found out that the average crystal grain size of the crystal grains forming the metal texture was 2 μm, and the ratio of the crystal grains of 1 μm or less was 20% in a cross sectional ratio.

The electric conductivity of the obtained drawn wire material was measured, and a cable having a cross section of 0.2 mm$^2$ was produced from the drawn wire material, so as to perform a cable bending test at room temperature. Here, the cable bending test was conducted by cyclically bending the cable side to side in a state in which the cable was subjected to a 100-g load, with a bending radius of 15 mm and a bending angle being in a range of ±90 degrees. Table 1 shows the value of the electric conductivity and the result of the cable bending test (the number of cycles to fracture of the cable).

TABLE 1

| Experimental example and Comparative example | Added amount of Sc (mass %) | Average crystal grain size (μm) | Cross sectional ratio of 1-μm or less crystal grain (%) | Average grain size of nano-precipitate (nm) | Number of cycles to fracture of cables (million times) | Conductivity (% IACS) | Heat resistance of wire material $(\sigma_{260}\sigma_{RT}) \times 100$ |
|---|---|---|---|---|---|---|---|
| Experimental example 1 | 0.1 | 2 | 20 | 2 | 3.00 | 61 | |
| Experimental example 2 | 0.2 | 2 | 20 | 20 | 5.00 | 61 | |
| Experimental example 3 | 0.3 | 2 | 20 | 20 | 13.00 | 61 | 98 |
| Experimental example 4 | 0.4 | 2 | 20 | 20 | 12.00 | 61 | |
| Experimental example 5 | 0.6 | 2 | 20 | 20 | 12.00 | 60 | |
| Experimental example 6 | 1.0 | 2 | 20 | 20 | 12.00 | 59 | |
| Experimental example 7 | 0.3 | 2 | 20 | 20 | 9.50 | 61 | |
| Experimental example 8 | 0.3 | 2 | 15 | 20 | 9.70 | 61 | |
| Experimental example 9 | 0.3 | 2 | 20 | 3 | 10.50 | 61 | |
| Experimental example 10 | 0.3 | 2 | 20 | 60 | 9.00 | 61 | |
| Experimental example 11 | 0.3 | 2 | 20 | 8 | 13.50 | 61 | |
| Experimental example 12 | 0.3 | 2 | 20 | 5 | 13.70 | 61 | |
| Experimental example 13 | 0.3 | 2 | 20 | 2 | 10.50 | 61 | |
| Experimental example 14 | 0.3 | 2 | 20 | 1 | 8.50 | 61 | |
| Experimental example 15 | 0.3 | 2 | 30 | 20 | 13.00 | 61 | |
| Comparative example 1 | 0 | 2 | 20 | • | 1.10 | 61 | |

TABLE 1-continued

| Experimental example and Comparative example | Added amount of Sc (mass %) | Average crystal grain size (μm) | Cross sectional ratio of 1-μm or less crystal grain (%) | Average grain size of nano-precipitate (nm) | Number of cycles to fracture of cables (million times) | Conductivity (% IACS) | Heat resistance of wire material ($\sigma_{260}/\sigma_{RT}$) × 100 |
|---|---|---|---|---|---|---|---|
| Comparative example 2 | 0.05 | 2 | 20 | ND | 1.20 | 61 | |
| Comparative example 3 | 2.0 | 2 | 20 | 20 | 12.00 | 57 | |
| Comparative example 4 | 5.0 | 2 | 20 | 100 | 9.00 | 53 | |

EXPERIMENTAL EXAMPLES 1-6, COMPARATIVE EXAMPLES 2-4

With use of aluminium having a purity of 99.95 mass % and scandium having a purity of 99 mass %, aluminium alloys containing 0.05 to 5.0 mass % of scandium were each cast to produce a conductive material block. Subsequently, after the conductive material block was subjected to an aging treatment at 350° C. for one hour, a wire rod having a diameter of 10 mm was collected by a cutting work, and the collected wire rod was molded into a wire having a diameter of 2 mm with use of a swaging machine. Subsequently, after the wire was subjected to a heat treatment at 450° C. for one hour, the wire was subjected to a die wire drawing work to produce a drawn wire material having a diameter of 80 μm. From metal texture observation of the drawn wire material, it was found out that the average crystal grain size of the crystal grains forming the metal texture was 2 μm, and the ratio of the crystal grains of 1 μm or less was 20% in a cross sectional ratio. Also, in the case in which 0.05 to 2.0 mass % of scandium was contained, nanoprecipitates of Al$_3$Sc having a grain size of 20 nm existed in the grain boundary of the crystal grains in comparative example 3 and in experimental examples 2 to 6; none were detected (ND) in comparative example 2; and nanoprecipitates of Al$_3$Sc of 2 nm existed in experimental example 1. In the case in which 5.0 mass % of scandium was contained (comparative example 4), nanoprecipitates of Al$_3$Sc having a grain size of 100 nm existed in the grain boundary of the crystal grains.

The electric conductivity of the obtained drawn wire material was measured, and a cable having a cross section of 0.2 mm$^2$ was produced from the drawn wire material, so as to perform the same cable bending test as that of comparative example 1. Table 1 shows the values of the electric conductivity and the results of the cable bending tests.

Each of the drawn wire materials of comparative example 2 and experimental examples 1 to 4 had a scandium content of 0.4 mass % or less, and the electric conductivity was 61% IACS, showing the same value as the electric conductivity of aluminium (comparative example 1). Further, when the content of scandium exceeded 0.4 mass %, the electric conductivity gradually decreased to be 60, 59, 57, and 53% IACS in experimental examples 5, 6 and comparative examples 3, 4 (scandium content being 0.6, 1.0, 2.0, and 5.0 mass %), respectively. In the cable bending test, when the scandium content was within a range of 0.05 to 2.0 mass %, the average crystal grain size of the crystal grains forming the metal texture was 2 μm; the ratio of the crystal grains of 1 μm or less was 20% in a cross sectional ratio; and the grain size of the nanoprecipitates was 20 nm or less. Therefore, in comparative example 2 and experimental examples 1 to 3, the number of cycles to fracture increases according as the scandium content increased; however, in experimental examples 4 to 6 and comparative example 3 in which the scandium content was 0.4 mass % or more, the number of cycles to fracture was almost constant. On the other hand, in comparative examples 3, 4, the number of cycles to fracture of the cable showed high values of 12 million times and 9 million times, respectively; however, the electric conductivity decreased because a large number of nanoprecipitates of Al$_3$Sc, which were an aluminium-scandium series intermetallic compound, were precipitated in the grain boundary. This raises a problem in forming an electric wire or cable using a conductor wire made of each of the drawn wire materials of comparative examples 3, 4.

Also, with respect to the drawn wire material of experimental example 3 in which the scandium content was 0.3 mass %, a tensile strength $\sigma_{260}$ immediately after being heated at 260° C. for one hour and a tensile strength $\sigma_{RT}$ at room temperature were determined, and the heat resistance ($\sigma_{260}/\sigma_{RT}$)×100 of the wire material was determined, with a result that the heat resistance was 98%.

Here, in comparative example 4 in which the scandium content was 5.0 mass %, the number of cycles to fracture decreased. This seems to be because the strength of the drawn wire material decreased due to the presence of the nanoprecipitates of 100 nm in the grain boundary of the crystal grains.

EXPERIMENTAL EXAMPLE 7

With use of aluminium having a purity of 99.95 mass % and scandium having a purity of 99 mass %, an aluminium alloy containing 0.3 mass % of scandium was cast to produce a conductive material block. Subsequently, after the conductive material block was subjected to an aging treatment at 350° C. for one hour, a wire rod having a diameter of 10 mm was collected by a cutting work and subsequently molded into a wire having a diameter of 1 mm with use of a swaging machine. After the wire was subjected to a heat treatment at 450° C. for one hour, the wire was subjected to a die wire drawing work to produce a drawn wire material having a diameter of 80 μm. From metal texture observation of the drawn wire material, it was found out that the average crystal grain size of the crystal grains forming the metal texture was 2 μm, and the ratio of the crystal grains of 1 μm or less was 20% in a cross sectional ratio. Also, nanoprecipitates of Al$_3$Sc having a grain size of 20 nm existed in the grain boundary of the crystal grains. The electric conductivity of the obtained drawn wire material was measured, and a cable having a cross section of 0.2 mm$^2$ was produced from the drawn wire material, so as to perform the same cable bending test as that of comparative example 1. Table 1 shows the value of the electric conductivity and the result of the cable bending test. The electric conductivity of the drawn wire material was 61% IACS, and the number of cycles to fracture in the cable bending test was 9.5 million times.

EXPERIMENTAL EXAMPLE 8

With use of aluminium having a purity of 99.95 mass % and scandium having a purity of 99 mass %, an aluminium alloy containing 0.3 mass % of scandium was cast to produce a conductive material block. Subsequently, after the conductive material block was subjected to an aging treatment at 350° C. for one hour, a wire rod having a diameter of 10 mm was collected from the conductive material block by a cutting work, and the collected wire rod was molded into a wire having a diameter of 1.5 mm with use of a swaging machine. Subsequently, after the wire was subjected to a heat treatment at 450° C. for 0.5 hour, the wire was subjected to a die wire drawing work to produce a drawn wire material having a diameter of 80 µm. From metal texture observation of the drawn wire material, it was found out that the average crystal grain size of the crystal grains forming the metal texture was 2 µm, and the ratio of the crystal grains of 1 µm or less was 15% in a cross sectional ratio. Also, nanoprecipitates of $Al_3Sc$ having a grain size of 20 nm existed in the grain boundary of the crystal grains.

The electric conductivity of the obtained drawn wire material was measured, and a cable having a cross section of 0.2 $mm^2$ was produced from the drawn wire material, so as to perform the same cable bending test as that of comparative example 1. Table 1 shows the value of the electric conductivity and the result of the cable bending test. The electric conductivity of the drawn wire material was 61% IACS, and the number of cycles to fracture in the cable bending test was 9.7 million times.

EXPERIMENTAL EXAMPLES 9, 10

With use of aluminium having a purity of 99.95 mass % and scandium having a purity of 99 mass %, an aluminium alloy containing 0.3 mass % of scandium was cast to produce a conductive material block. Subsequently, after the conductive material block was subjected to an aging treatment at 350° C. for 8 minutes and for 120 hours, respectively, a wire rod having a diameter of 10 mm was collected from the conductive material block by a cutting work, and the collected wire rod was molded into a wire having a diameter of 1.5 mm with use of a swaging machine. Subsequently, after the wire was each subjected to a heat treatment at 450° C. for one hour, the wire was subjected to a die wire drawing work to produce a drawn wire material having a diameter of 80 µm. From metal texture observation of the drawn wire material, it was found out that the average crystal grain size of the crystal grains forming the metal texture was 2 µm, and the ratio of the crystal grains of 1 µm or less was 20% in a cross sectional ratio. Also, in experimental example 9 in which the aging treatment at 350° C. for 8 minutes had been performed, nanoprecipitates of $Al_3Sc$ having a grain size of 3 nm existed in the grain boundary of the crystal grains. In experimental example 10 in which the aging treatment at 350° C. for 120 hours had been performed, nanoprecipitates of $Al_3Sc$ having a grain size of 60 nm existed in the grain boundary of the crystal grains.

The electric conductivity of the obtained drawn wire material was measured, and a cable having a cross section of 0.2 $mm^2$ was produced from the drawn wire material, so as to perform the same cable bending test as that of comparative example 1. Table 1 shows the values of the electric conductivity and the results of the cable bending tests. The electric conductivity of the drawn wire material of experimental example 9 was 61% IACS, and the number of cycles to fracture in the cable bending test was 10.5 million times. The electric conductivity of the drawn wire material of experimental example 10 was 61% IACS, and the number of cycles to fracture in the cable bending test was 9 million times. The reason why the number of cycles to fracture in experimental example 9 decreased to be 10.5 million times as compared with experimental example 3 seems to be that the function of pinning the cracks by the nanoprecipitates decreased because the grain size of the nanoprecipitates was small.

EXPERIMENTAL EXAMPLES 11-14

With use of aluminium having a purity of 99.95 mass % and scandium having a purity of 99 mass %, aluminium alloys containing 0.3 mass % of scandium were each cast to produce a conductive material block. Subsequently, after the conductive material block was subjected to an aging treatment at 325° C. for one hour, at 300° C. for one hour, at 300° C. for 30 minutes, and at 300° C. for 8 minutes, respectively, a wire rod having a diameter of 10 mm was collected by a cutting work, and the collected wire rod was molded into a wire having a diameter of 2 mm with use of a swaging machine. Subsequently, after the wire was subjected to a heat treatment at 325° C. for one hour, at 325° C. for one hour, at 250° C. for one hour, and at 250° C. for one hour, respectively, the wire was subjected to a die wire drawing work to produce a drawn wire material having a diameter of 80 µm. From metal texture observation of the drawn wire material, it was found out that the average crystal grain size of the crystal grains forming the metal texture was 2 µm, and the ratio of the crystal grains of 1 µm or less was 20% in a cross sectional ratio. Also, in the case in which the aging treatment at 325° C. for one hour had been performed, nanoprecipitates of $Al_3Sc$ having a grain size of 8 nm existed in the grain boundary of the crystal grains (experimental example 11). In the case in which the aging treatment at 300° C. for one hour had been performed, nanoprecipitates having an average grain size of 5 nm existed in the grain boundary (experimental example 12). In the case in which the aging treatment at 300° C. for 30 minutes had been performed, nanoprecipitates having an average grain size of 2 nm existed in the grain boundary (experimental example 13). In the case in which the aging treatment at 300° C. for 8 minutes had been performed, nanoprecipitates having an average grain size of 1 nm existed in the grain boundary (experimental example 14).

The electric conductivity of the obtained drawn wire material was measured, and a cable having a cross section of 0.2 $mm^2$ was produced from the drawn wire material, so as to perform the same cable bending test as that of comparative example 1. Table 1 shows the values of the electric conductivity and the results of the cable bending tests.

The electric conductivity of each of the drawn wire materials of experimental examples 11 to 14 was 61% IACS. Also, when the same cable bending test as that of comparative example 1 was conducted, the following results were obtained. In the case in which the average grain size of the nanoprecipitates was 8 nm (experimental example 11) and in the case in which the average grain size of the nanoprecipitates was 5 nm (experimental example 12), the number of cycles to fracture exceeded 13 million times. However, when the average grain size of the nanoprecipitates decreased to be 2 nm (experimental example 13), the number of cycles to fracture decreased to be 10.5 million times. When the average grain size of the nanoprecipitates decreased to be 1 nm (experimental example 14), the number of cycles to fracture was 8.5 million times. This seems to be due to the following reason. When the average grain size of the nanoprecipitates is 1 nm, the grain growth of the nanoprecipitates is insufficient, so that the effect of pinning the cracks by the nanoprecipitates decreases. Therefore, it will be understood that the average grain size of the nanoprecipitates is more preferably 5 to 50 nm.

EXPERIMENTAL EXAMPLE 15

With use of aluminium having a purity of 99.95 mass % and scandium having a purity of 99 mass %, an aluminium alloy containing 0.3 mass % of scandium was cast to produce a conductive material block. Subsequently, after the conductive material block was subjected to an aging treatment at 350° C. for one hour, a wire rod having a diameter of 10 mm was collected from the conductive material block by a cutting work, and the collected wire rod was molded into a wire having a diameter of 3 mm with use of a swaging machine. Subsequently, after the wire was subjected to a heat treatment at 450° C. for one hour, the wire was subjected to a die wire drawing work to produce a drawn wire material having a diameter of 80 μm. From metal texture observation of the drawn wire material, it was found out that the average crystal grain size of the crystal grains forming the metal texture was 2 μm, and the ratio of the crystal grains of 1 μm or less was 30% in a cross sectional ratio. Also, nanoprecipitates of $Al_3Sc$ having a grain size of 20 nm existed in the grain boundary of the crystal grains.

The electric conductivity of the obtained drawn wire material was measured, and a cable having a cross section of 0.2 mm² was produced from the drawn wire material, so as to perform the same cable bending test as that of comparative example 1. Table 1 shows the value of the electric conductivity and the result of the cable bending test. The electric conductivity of the drawn wire material was 61% IACS, and the number of cycles to fracture in the cable bending test was 13 million times.

EXPERIMENTAL EXAMPLES 16-19, COMPARATIVE EXAMPLES 5-7

With use of aluminium having a purity of 99.95 mass %, scandium having a purity of 99 mass %, and zirconium having a purity of 99 mass %, an aluminium alloy containing 0.3 mass % of scandium and 0.01 to 1.0 mass % of zirconium was each cast to produce a conductive material block. Subsequently, after the conductive material block was subjected to an aging treatment at 350° C. for 24 hours, a wire rod having a diameter of 10 mm was collected from the conductive material block by a cutting work, and the collected wire rod was molded into a wire having a diameter of 1.5 mm with use of a swaging machine. Subsequently, after the wire was subjected to a heat treatment at 450° C. for one hour, the wire was subjected to a die wire drawing work to produce a drawn wire material having a diameter of 80 μm. From metal texture observation of the drawn wire material, it was found out that the average crystal grain size of the crystal grains forming the metal texture was 2 μm, and the ratio of the crystal grains of 1 μm or less was 20% in a cross sectional ratio. Also, nanoprecipitates of $Al_3Sc$ having a grain size of 20 nm existed in the grain boundary of the crystal grains.

The electric conductivity of the obtained drawn wire material was measured, and a cable having a cross section of 0.2 mm² was produced from the drawn wire material, so as to perform the same cable bending test as that of comparative example 1 and to evaluate the heat resistance of the wire material by the same method as that of experimental example 3. Table 2 shows the values of the electric conductivity, the results of the cable bending tests, and the results of evaluation of the heat resistance.

TABLE 2

| Experimental example and Comparative example | Added amount of Sc (mass %) | Added amount of Zr (mass %) | Average crystal grain size (μm) | Cross sectional ratio of 1-μm or less crystal grain (%) | Average grain size of nano-precipitate (nm) | Number of cycles to fracture of cables (million times) | Conductivity (% IACS) | Heat resistance of wire material $(\sigma_{260}/\sigma_{RT}) \times 100$ |
|---|---|---|---|---|---|---|---|---|
| Experimental example 16 | 0.3 | 0.01 | 2 | 20 | 20 | 13.00 | 61 | 98 |
| Experimental example 17 | 0.3 | 0.05 | 2 | 20 | 20 | 12.00 | 60 | 99 |
| Experimental example 18 | 0.3 | 0.1 | 2 | 20 | 20 | 11.00 | 60 | 100 |
| Experimental example 19 | 0.3 | 0.2 | 2 | 20 | 20 | 10.00 | 57 | 100 |
| Experimental example 20 | 0.3 | 0.1 | 2 | 20 | 20 | 9.40 | 60 | |
| Experimental example 21 | 0.3 | 0.1 | 2 | 15 | 20 | 9.50 | 60 | |
| Experimental example 22 | 0.3 | 0.1 | 2 | 20 | 3 | 7.50 | 60 | |
| Experimental example 23 | 0.3 | 0.1 | 2 | 20 | 60 | 8.00 | 60 | |
| Experimental example 24 | 0.3 | 0.1 | 2 | 20 | 8 | 11.00 | 60 | 100 |
| Comparative example 5 | 0.3 | 0.3 | 2 | 20 | 20 | 9.50 | 55 | 100 |

TABLE 2-continued

| Experimental example and Comparative example | Added amount of Sc (mass %) | Added amount of Zr (mass %) | Average crystal grain size (μm) | Cross sectional ratio of 1-μm or less crystal grain (%) | Average grain size of nano-precipitate (nm) | Number of cycles to fracture of cables (million times) | Conductivity (% IACS) | Heat resistance of wire material ($\sigma_{260}/\sigma_{RT}$) × 100 |
|---|---|---|---|---|---|---|---|---|
| Comparative example 6 | 0.3 | 0.5 | 2 | 20 | 20 | 8.00 | 52 | 100 |
| Comparative example 7 | 0.3 | 1.0 | 2 | 20 | 20 | 7.00 | 44 | 100 |

The electric conductivity of each of the drawn wire materials of experimental examples 16 to 19 and comparative examples 5 to 7 decreased according as the content of zirconium increased. In comparative examples 5 to 7 in which the content of zirconium was 0.3 mass % or more, the electric conductivity greatly decreased to be 55, 52, and 44% IACS, respectively. In the cable bending test at room temperature, the number of cycles to fracture decreased from 13 million times to 7 million times according as the content of zirconium increased from 0.01 mass % to 1.0 mass %. Here, though the number of cycles to fracture of the cable shows high values of 9.5 million times, 8 million times, and 7 million times, respectively, in comparative examples 5 to 7, the electric conductivity decreases due to the presence of zirconium in the grain boundary and in the grains of the metal texture. This raises a problem in forming an electric wire or cable using a conductor wire made of each of the drawn wire materials of comparative examples 5 to 7.

Also, when the heat resistance of the wire materials was evaluated, the heat resistance was almost 100%. On the other hand, the heat resistance of the wire material of experimental example 3 in which zirconia had not been added was 98%, thereby confirming that the decrease in heat resistance can be prevented by addition of zirconia.

EXPERIMENTAL EXAMPLE 20

With use of aluminium having a purity of 99.9 mass %, scandium having a purity of 99 mass %, and zirconium having a purity of 99 mass %, an aluminium alloy containing 0.3 mass % of scandium and 0.1 mass % of zirconium was cast to produce a conductive material block. Subsequently, after the conductive material block was subjected to an aging treatment at 350° C. for 24 hours, a wire rod having a diameter of 10 mm was collected from the conductive material block by a cutting work, and the collected wire rod was molded into a wire having a diameter of 1.5 mm with use of a swaging machine. Subsequently, after the wire was subjected to a heat treatment at 450° C. for one hour, the wire was subjected to a die wire drawing work to produce a drawn wire material having a diameter of 80 μm. From metal texture observation of the drawn wire material, it was found out that the average crystal grain size of the crystal grains forming the metal texture was 2 μm, and the ratio of the crystal grains of 1 μm or less was 20% in a cross sectional ratio. Also, nanoprecipitates of Al₃Sc having a grain size of 20 nm existed in the grain boundary of the crystal grains.

The electric conductivity of the obtained drawn wire material was measured, and a cable having a cross section of 0.2 mm² was produced from the drawn wire material, so as to perform the same cable bending test as that of comparative example 1. Table 2 shows the value of the electric conductivity and the result of the cable bending test. The electric conductivity of the drawn wire material was 60% IACS, and the number of cycles to fracture in the cable bending test was 9.4 million times.

EXPERIMENTAL EXAMPLE 21

With use of aluminium having a purity of 99.95 mass %, scandium having a purity of 99 mass %, and zirconium having a purity of 99 mass %, an aluminium alloy containing 0.3 mass % of scandium and 0.1 mass % of zirconium was cast to produce a conductive material block. Subsequently, after the conductive material block was subjected to an aging treatment at 350° C. for 24 hours, a wire rod having a diameter of 10 mm was collected from the conductive material block by a cutting work, and the collected wire rod was molded into a wire having a diameter of 1.5 mm with use of a swaging machine. Subsequently, after the wire was subjected to a heat treatment at 450° C. for 0.5 hour, the wire was subjected to a die wire drawing work to produce a drawn wire material having a diameter of 80 μm. From metal texture observation of the drawn wire material, it was found out that the average crystal grain size of the crystal grains forming the metal texture was 2 μm, and the ratio of the crystal grains of 1 μm or less was 15% in a cross sectional ratio. Also, nanoprecipitates of Al₃Sc having a grain size of 20 nm existed in the grain boundary of the crystal grains.

The electric conductivity of the obtained drawn wire material was measured, and a cable having a cross section of 0.2 mm² was produced from the drawn wire material, so as to perform the same cable bending test as that of comparative example 1. Table 2 shows the value of the electric conductivity and the result of the cable bending test. The electric conductivity of the drawn wire material was 60% IACS, and the number of cycles to fracture in the cable bending test was 9.5 million times.

EXPERIMENTAL EXAMPLES 22, 23

With use of aluminium having a purity of 99.95 mass %, scandium having a purity of 99 mass %, and zirconium having a purity of 99 mass %, an aluminium alloy containing 0.3 mass % of scandium and 0.1 mass % of zirconium was cast to produce a conductive material block. Subsequently, after the conductive material block was subjected to an aging treatment at 350° C. for 8 minutes and for 120 hours, respectively, a wire rod having a diameter of 10 mm was collected from the conductive material block by a cutting work, and the collected wire rod was molded into a wire having a diameter of 1.5 mm with use of a swaging machine.

Subsequently, after the wire was subjected to a heat treatment at 450° C. for one hour, respectively, the wire was subjected to a die wire drawing work to produce a drawn wire material having a diameter of 80 μm. From metal texture observation of the drawn wire material, it was found out that the average crystal grain size of the crystal grains forming the metal texture was 2 μm, and the ratio of the crystal grains of 1 μm or less was 20% in a cross sectional ratio. Also, in experimental example 22 in which the heat treatment at 350° C. for 8 minutes had been performed, nanoprecipitates of Al$_3$Sc having a grain size of 3 nm existed in the grain boundary of the crystal grains. In experimental example 23 in which the heat treatment at 350° C. for 120 hours had been performed, nanoprecipitates of Al$_3$Sc having a grain size of 60 nm existed in the grain boundary of the crystal grains.

EXPERIMENTAL EXAMPLE 24

With use of aluminium having a purity of 99.95 mass %, scandium having a purity of 99 mass %, and zirconium having a purity of 99 mass %, an aluminium alloy containing 0.3 mass % of scandium and 0.1 mass % of zirconium was cast to produce a conductive material block. Subsequently, after the conductive material block was subjected to an aging treatment at 325° C. for 5 hours, a wire rod having a diameter of 10 mm was collected from the conductive material block by a cutting work, and the collected wire rod was molded into a wire having a diameter of 2.0 mm with use of a swaging machine. Subsequently, after the wire was subjected to a heat treatment at 325° C. for one hour, the wire was subjected to a die wire drawing work to produce a drawn wire material having a diameter of 80 μm. From metal texture observation of the drawn wire material, it was found out that the average crystal grain size of the crystal grains forming the metal texture was 2 μm, and the ratio of the crystal grains of 1 μm or less was 20% in a cross sectional ratio. Also, nanoprecipitates of Al$_3$Sc having a grain size of 8 nm existed in the grain boundary of the crystal grains.

The electric conductivity of the obtained drawn wire material was measured, and a cable having a cross section of 0.2 mm$^2$ was produced from the drawn wire material, so as to perform the same cable bending test as that of comparative example 1 and to evaluate the heat resistance of the wire material by the same method as that of experimental example 3. Table 2 shows the value of the electric conductivity, the result of the cable bending test, and the result of evaluation of the heat resistance.

The electric conductivity of the drawn wire material was 60% IACS; the number of cycles to fracture in the cable bending test was 1 million times; and the heat resistance of the wire material was almost 100%.

The present invention is not limited to the above-described examples, and a construction thereof can be changed within a range that does not change the gist of the present invention.

For example, a conductive material block was produced by casting an aluminium alloy, and subsequently, an aging treatment of this conductive material block was performed; however, the aging treatment may be performed after a solution treatment (for example, 550 to 600° C.) of the produced conductive material block is performed.

Also, the conductor wire diameter (wire diameter of the drawn wire material) forming the conductor wire was set to be 80 to 120 μm; however, the wire diameter of the drawn wire material can be selected in an arbitrary manner within a range of 0.05 mm or more to 0.5 mm or less in accordance with the place of use and the state of use of the electric wire or cable.

INDUSTRIAL APPLICABILITY

The aluminium-based conductive material of the present invention as well as an electric wire and a cable using the same are resistant to dynamic driving tests (for example, cyclic bending) of at least 3 million times (more preferably 5 million times, and further more preferably 10 million times), so that the aluminium-based conductive material can be used, for example, in wiring industrial robots, commercial robots, or various devices, particularly in wiring a part loaded with cyclic bending, such as a driving part, and disconnection at the time of using the electric wire or cable can be prevented, thereby improving the reliability of the robots or various devices. As a result of this, the burden in maintaining the robots or various devices can be alleviated, thereby achieving reduction of the operation costs.

REFERENCE SIGNS LIST

10: metal texture, 11: crystal grain, 12: grain boundary, 13: nanoprecipitate, 14: metal texture, 15: crystal grain, 16: grain boundary, 17: nanoprecipitate

The invention claimed is:

1. An aluminum-based conductive material obtained from an aluminum alloy, consisting of 0.1 to 1.0 mass % of scandium and, as a remainder, aluminum and unavoidable impure substances, wherein:
    aluminum alloy is subjected to an aging treatment and a cutting work to form a wire rod, and the wire rod is subjected to a die wire drawing work, thereby allowing the scandium existing in crystal grains and grain boundary of the aluminum to precipitate in the grain boundary as an intermetallic compound, to form the aluminum-based conductive material;
    the aluminum-based conductive material is formed of a metal texture having crystal grains with an average grain size of 2 μm or less and containing the crystal grains of 1 μm or less at a cross sectional ratio of 15% or more;
    the metal texture has aluminum-scandium series nanoprecipitates generated in the grain boundary of the crystal grains, the nanoprecipitates having an average grain size of 1 to 60 nm, the average grain size allowing the function of pinning cracks; and
    the aluminum-based conductive material is resistant to three million times of dynamic driving tests.

2. The aluminum-based conductive material as defined in claim 1, wherein the metal texture contains the crystal grains of 1 μm or less at a cross sectional ratio of 20% or more, and the aluminum-based conductive material is resistant to ten million times of dynamic driving tests.

3. The aluminum-based conductive material as defined in claim 1, wherein the wire rod is performed a die wire drawing work at a low temperature after the wire rod is subjected to a heat treatment.

4. An electric wire, using the aluminum-based conductive material as defined in claim 1 as a conductor wire, the conductor wire having a diameter of 0.05 mm or more and 0.5 mm or less.

5. A cable, using the aluminum-based conductive material as defined in claim 1 as a conductor wire.

6. The aluminum-based conductive material as defined in claim 1, wherein before the die wire drawing work, the wire rod is subjected to a rotary forging work using a swaging machine until a predetermined diameter is attained, and a heat treatment to promote formation of isometric crystals.

* * * * *